United States Patent [19]

Curtius

[11] Patent Number: 5,064,625
[45] Date of Patent: Nov. 12, 1991

[54] METHOD OF REMOVING NITROGEN OXIDES FROM FLUE GASES

[76] Inventor: Friedrich Curtius, Schachener Strasse 72, D-8990 Lindau, Fed. Rep. of Germany

[21] Appl. No.: 459,776

[22] Filed: Jan. 9, 1990

[30] Foreign Application Priority Data

Jul. 9, 1987 [CH] Switzerland ............... 2608/87-5

[51] Int. Cl.$^5$ .................. C01B 21/00; C01B 21/40; C01B 21/44; C01B 21/46
[52] U.S. Cl. .................................. 423/235; 423/393
[58] Field of Search ............ 423/235, 235 D, 239 A, 423/393

[56] References Cited

U.S. PATENT DOCUMENTS

| | | | |
|---|---|---|---|
| 4,309,396 | 1/1982 | Herbrechtsmeyer | 423/393 |
| 4,341,747 | 1/1982 | Downey | 423/235 |
| 4,603,036 | 7/1986 | Botton et al. | 423/235 |
| 4,663,135 | 5/1987 | Miller | 423/235 |

FOREIGN PATENT DOCUMENTS

| | | |
|---|---|---|
| 0008488 | 5/1980 | European Pat. Off. . |
| 0026418 | 4/1981 | European Pat. Off. . |
| 436363 | 2/1975 | Fed. Rep. of Germany . |
| 3436699 | 4/1986 | Fed. Rep. of Germany . |
| 2333560 | 7/1977 | France . |

OTHER PUBLICATIONS

Ullmann, 1964 Edition, vol. 15, "Salpetersäure", pp. 22-25.

Primary Examiner—Gregory A. Heller
Attorney, Agent, or Firm—Spencer & Frank

[57] ABSTRACT

In a process for the removal of nitrogen oxides ($NO_x$) from pretreated flue gases having a nitrogen oxide content which is low by means of a multi-stage washing process employing a nitric acid ($HNO_3$) solution to which is added hydrogen peroxide ($H_2O_2$), the process including a first stage in which the pretreated flue gases are received and contacted with nitric acid ($HNO_3$) vapor to at least partially oxidize nitrogen monoxide (NO) present in the pretreated flue gases to nitrogen dioxide ($NO_2$) and result in a first stage flue gas, and a second stage in which the first stage flue gas in received and washed with an aqueous nitric acid ($HNO_3$) solution to which is added $H_2O_2$ to remove nitrogen dioxide ($NO_2$) and any remaining nitrogen monoxide (NO) from the first stage flue gas and result in a second stage flue gas, wherein the pretreated flue gases have been treated to free the flue gases of contaminants including at least one of sulfur dioxide ($SO_2$), hydrogen chloride (HCl) and hydrogen fluoride (HF), which contaminants are at least one of $H_2O_2$—decomposing or corrosive, and have been treated to free the flue gases of solid particles, the improvement including: adding to the first stage heat sufficient to prevent $H_2O$ condensation from the first stage flue gas; decontaminating the diluted nitric acid ($HNO_3$) generated in the second stage when the nitrogen oxide content of the flue gas is above a defined level by, prior to the second stage, concentrating the nitrogen oxide in an absorption process; and providing a third stage in which the second stage flue gas is received and washed with a diluted, aqueous nitric acid ($HNO_3$) solution to remove any remaining nitric acid ($HNO_3$) vapor from the second stage flue gas.

19 Claims, 3 Drawing Sheets

METHOD OF REMOVING NITROGEN OXIDES FROM FLUE GASES

BACKGROUND OF THE INVENTION

1. Field of the Invention

The invention relates to a method of removing nitrogen oxides ($NO_x$) from flue gases by way of a multi-stage washing process with nitric acid ($HNO_3$) solution to which hydrogen peroxide ($H_2O_2$) is added, with the flue gases previously having been freed of $H_2O_2$-decomposing and/or corrosive contaminants, such as, for example, sulfur dioxide ($SO_2$), hydrogen chloride (HCl) or hydrogen fluoride (HF) and of solid particles.

2. Background of the Related Art

For the combined removal of sulfur dioxide ($SO_2$) and nitrogen oxides ($NO_x$), a multi-stage process is known from Federal Republic of Germany Published Patent Application No. 3,436,699 which, in its first stages, washes out sulfur dioxide with the aid of sulfuric acid ($H_2SO_4$) and hydrogen peroxide ($H_2O_2$) while in the last stage nitrogen oxides are removed by means of nitric acid ($HNO_3$) and $H_2O_2$. Processes are also known which, for the sole removal of nitrogen oxides, likewise operate with $HNO_3/H_2O_2$ mixtures. With these prior art processes, the degrees of purity required today—for example, $NO_x$ not exceeding 70 mg/Nm3—cannot be realized.

SUMMARY OF THE INVENTION

It is therefore an object of the invention to provide a process for wet washing $NO_x$-charged flue gases with $HNO_3$ and $H_2O$ with which $NO_x$ can be removed from the flue gases to the purities required today.

According to the invention, this is accomplished in that, in a first stage for the at least partial oxidation of nitrogen monoxide (NO) to nitrogen dioxide ($NO_2$), the flue gases are treated with $HNO_3$ vapor; that further, in a second stage, $NO_2$ and/or a mixture of NO and $NO_2$ are washed out in an at least single-stage washing process and that finally, in a third stage, $HNO_3$ vapor escaping from the second stage is washed out of the flue gases by washing with diluted $HNO_3$.

Ullmann, 1964 Edition, Volume 15, describes nitric acid in detail. At page 22, there appears the absorption equation for $NO_2$ with $H_2O$. The reaction and its possible partial reactions are described as being comparatively quick. If one changes the equilibrium, for example, by evaporation of $HNO_3$ with the introduction of heat, the reactions move in the other direction (desorption) and one obtains the equation for oxidation. This equation is marked (1) further below.

Another description of the reactions can be found in Federal Republic of Germany Published Patent Application No. 2,436,363.B2 by Ugine Kuhlmann, Paris. Here, a higher residual $NO_x$ content of 400 mg/Nm3 is desired, while 70 mg/Nm3 and less are required for heating plants and/or trash combustion. The oxidation of NO with $HNO_3$, as it is described at column 4, lines 3-30, has the drawback, at least for the flue gases which are saturated with water vapor at 40° to 50° C., that the partial pressure of the water above the diluted nitric acid is lower than the partial pressure of the water vapor in the incoming flue gas.

With an equilibrium temperature of 40° C., the difference between the partial pressures of water vapor in the saturated gas and above a 20% $HNO_3$ solution is already 7.8 mm Hg. However, the partial pressure of $HNO_3$ above its 20% solution is only less than 0.07 mm Hg, i.e., about 1/100 of the pressure difference of the water vapor. Thus, for the desired use, the Kuhlmann process has the drawback that, due to the greater driving descent of the water vapor—from gas into liquid—the transport of substances in the water vapor from the flue gas into the acid is more than ten times greater than the evaporation of $HNO_3$ from the acid. Moreover, the condensation of the water vapor will initially prevent the locally initiated $HNO_3$ evaporation by producing a dilution effect in the acid.

According to the invention, this drawback is overcome in that the prepurified, saturated flue gases and, as a consequence thereof, also the treatment medium $HNO_3$, are heated to such an extent that (1) the above-described difference in partial pressures of the water vapor in the flue gas and above the $HNO_3$ solution is equalized;

(2) the flue gas enthalpy lies so far above that of the saturated flue gas that the $HN0_3$ and its associated water component are also able to evaporate to keep the acid concentration in the washer constant;

(3) the conditions listed under (1) and (2), above, cause a substance transport to develop only from the liquid to the gas.

Regarding the circulation of the liquids and the decontamination of the liquids, it is an additional object of the invention to produce the $HNO_3$ developing from the washing with $H_2O$, $HNO_3$ and $H_2O_2$ in such a quality that it can be employed as a useful substance; and to decontaminate the other, contaminated and/or diluted residues from the individual washing stages in the preceding process stages and to put them to some use.

It is known that the $NO_x$ in flue gas is present quite predominantly (more than 95%) as NO. As tests have shown, a separation of $NO_x$ from the gaseous phase can be accomplished successfully by way of two known reaction paths. The one path (A) requires complete oxidation of NO to $NO_2$ in the gaseous phase, with such $NO_2$ being in equilibrium with its dimer $N_2O_4$; in the liquid phase the latter reacts with water ($H_2O$) to form $HNO_3$ and nitrous acid ($HNO_2$).

In the second reaction sequence (B), it is merely necessary to oxidize a fraction of the NO to $NO_2$ in the gaseous phase. If both components are present in a mole ratio of 1:1, an equilibrium with $N_2O_3$ will develop in the gaseous phase which, in a liquid phase, initially reacts to form $HNO_2$ and, in the presence of $H_2O_2$, continues to react to form $HNO_3$ and $H_2O$.

In this connection, it is of advantage for the quantity of $HNO_3$ vapor in the first stage to be set in dependence on the NO and $NO_x$ concentrations in the flue gases to be purified.

Since oxidation of NO to $NO_2$ in the gaseous phase occurs, in the presence of $HNO_3$ and $H_2O$ vapor according to the following reaction equation:

$$NO + 2HNO_3 \rightarrow 3NO_2 + H_2O \tag{1}$$

it is necessary, for the second reaction path B (FIG. 1) described above, to oxidize ⅓ of the NO concentrations present in the flue gases. Consequently it is advantageous for the $HNO_3$ vapor quantity in the first stage to be set so that in this first stage an $NO/NO_2$ mixture is produced at a ratio of 1:1. For path B, as will be described later in connection with FIG. 1, the HNO₃ vapor quantity required for the oxidation reaction and thus the associated HNO₃ vapor pressure are considerably reduced in the gaseous phase. Therefore less energy is required for the recovery of HNO₃ vapor and possibly lower HNO₃ concentrations, particularly in the washing liquid of the first or oxidation stage.

For a successful removal of NO from the flue gases it is also necessary to at least partially oxidize the NO to $NO_2$. This occurs in the gaseous phase of the first stage of the novel process according to the above reaction equation (1).

The required HNO₃ vapor can thus advantageously be fed wholly or partially directly as vapor upstream of or into the first stage, with it being generated either in an external evaporation system or being returned in the form of flue gases enriched therewith from the second stage into the first stage. If HNO₃ vapor is made available completely by direct feeding of HNO₃ vapor into the flue gases, the system required for the process can be simplified in that the first stage is constructed as a simple direct contact path.

Independently of the type of HNO₃ vapor treatment that follows, it is always of advantage to initially heat the saturated flue gases by about 3° to 6° C., either directly by way of a heat exchanger or by admixing a dry, hotter gas, e.g., air.

Another possibility for generating the necessary HNO₃ vapor is to configure the first stage as a washing stage with HNO₃ as the washing liquid and to effect evaporation of HNO₃ from this washing liquid by adding a quantity of heat in or upstream of the first stage. This heat may here be added directly to the flue gases or—by way of a heat exchanger—also to the washing liquid circulating in the first stage.

Under certain circumstances, it may be advisable to add H₂O₂ to the washing liquid already in the first stage so as to convert part of the developed NO₂ to nitric acid according to the following reaction equation:

$$2NO_2 + H_2O_2 \rightarrow 2\ HNO_3 \tag{2}$$

and thus to "wash it out" of the flue gases; additionally, residual contaminants such as SO₂ may be bound into the washing liquid of the first stage together with the H₂O₂ which is added in the form of a 60% solution (all percentages are weight percentages). In this stage, as well as in the second stage to be described below, the use of a commercially available 30 to 35% H₂O₂ solution is also possible.

The first washing stage described as the other possibility has the advantage compared to the vaporous charging of HNO₃ into the flue gas that residual contaminants are washed out of the flue gases in this stage.

Further contamination of the subsequent stages on the gas side and/or in the liquid with HC and/or SO₂/SO₃ and solid contaminants can thus be substantially avoided.

Correspondingly, the vaporous charge of HNO₃ is available for use downstream of petroleum fires since here no contaminations that would be damaging for the quality of the acid are present in the flue gas.

Essentially, however, the $NO_x$ are washed out in the second stage of the process with the addition of H₂O₂ which is also fed as an about 60% aqueous solution into the HNO₃ circulating in the second stage as the washing liquid, with the quantities of H₂O₂ fed into the second stage being set at the inlet of the first and/or second stage to correspond to the $NO_x$ concentrations in the flue gases and, further, the HNO₃ concentrations in the second stage are regulated by the addition of washing liquid from the third stage or of fresh water according to the $NO_x$ concentrations and the quantities of H₂O₂ fed in.

Corresponding to the partial pressure in the liquid, part of the developing HNO₃ is present as vapor and is thus able to escape together with the purified flue gases. The quantities of HNO₃ carried along by the flue gases from the second stage can be reduced if the $NO_x$ washing in the second stage is performed in at least two partial stages; it has here been found to be favorable to add H₂O₂ in measured quantities into the washing liquids of all partial stages, with the quantities of H₂O₂ added being divided in such a way that a preselected maximum HNO₃ concentration of the washing liquid is not exceeded in the last partial stage.

As described in Ullmann, the heat coloration of the separation reactions is positive, i.e., an excess of heat exists. With greater $NO_x$ intake concentrations, this heat can be removed by way of cooling registers in the liquid circuits.

Finally, in the third stage, the flue gases are separated from the HNO₃ vapor carried along from the second stage. To reduce the HNO₃ vapor pressure and thus to further increase the condensation of HNO₃ in the washing liquid circulating in the third stage, it is appropriate for the washing liquid of the third stage to be cooled in a cooler, with the cooling power in the third stage being regulated in dependence on the permissible maximum concentration of HNO₃ in the purified flue gas.

The excess HNO₃ produced in the novel process can be advantageously fed as washing liquid to a flue gas purification process preceding this process.

BRIEF DESCRIPTION OF THE DRAWINGS

The invention will now be described in greater detail with reference to embodiments thereof and in connection with the drawing figures.

FIG. 2 represents a system scheme for implementing the novel process; while

DETAILED DESCRIPTION OF THE PREFERRED EMBODIMENTS

Figure 1:
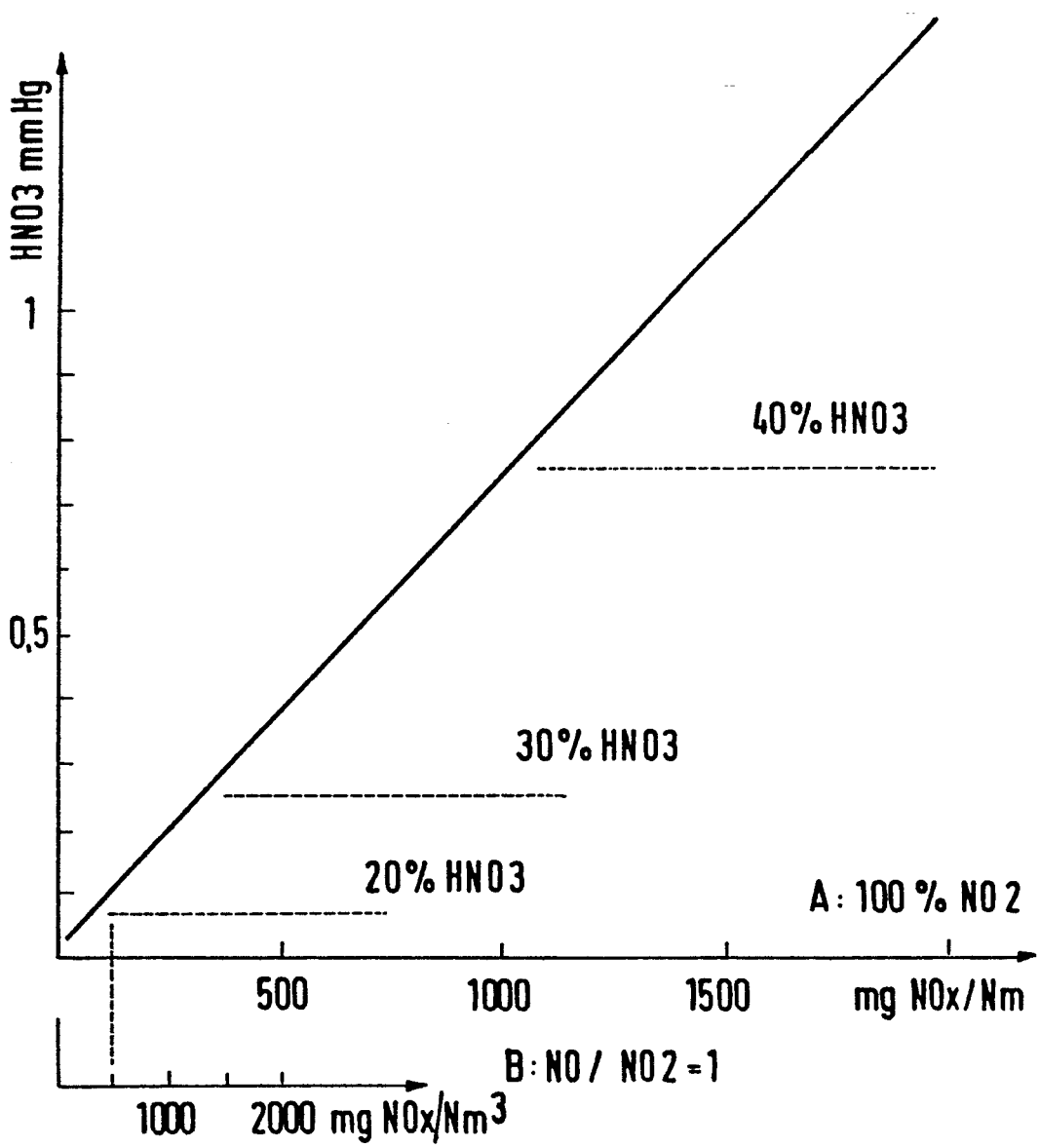
FIG. 1 is a diagram of the HNO₃ vapor pressure required for complete NO oxidation in the first stage as a function of the quantity of $NO_x$ in the flue gases.

In the diagram of FIG. 1, the quantity of $NO_x$ is plotted in mg/Nm3 on the abscissa and the ordinate represents the HNO₃ vapor pressure in mm Hg for a complete oxidation of NO to $NO_2$. Washing liquids with different required HNO₃ concentrations are given as parameters since the vapor pressure is not only a function of temperature but—in competition with the H₂O vapor pressure—also a function of the concentration of the liquid phase in equilibrium therewith. The abscissa shown in long solid lines in FIG. 1 is applicable for the described reaction mechanism A in which NO is completely oxidized to $NO_2$, while the abscissa section shortened to ¼ [of its length] applies for the described procedure B in which $NO/NO_2$ is present at a ratio of 1:1.

In practice, the operating point lies between the possible procedures of A and B. Operation under full load, as set for the conditions of B, requires longer reaction times for operation with a reduced gas throughput, i.e., partial load. Thus relatively more NO is oxidized so that the conditions shift in direction A for load fluctuations.

The diagram of FIG. 1 is calculated for washing liquid temperatures of 50° C. Although the relationship between the $HNO_3$ vapor pressure and the quantity of $NO_x$ is independent of the temperature, the entered $HNO_3$ concentrations of the washing liquids are applicable only for the listed temperature of 50° C. For a higher temperature, the $HNO_3$ partial pressure above the liquid rises so that the concentrations of the required washing liquids can be reduced.

The flue gases freed of $H_2O_2$-contaminating and/or corrosive contaminants but containing $NO_x$ and $H_2O$ vapors from a flue gas purification system not shown in detail flow into the part of the system serving to separate the $NO_x$ through a conduit 1 (FIG. 2) in which a heat exchanger 2 for temperature equalization in the flowing flue gases and a mixing path 3 equipped with static mixers, e.g., Sulzer gas mixers of type SMV, are provided. Conduit 1 opens into a reactor 4 in which the first stage of the purification process is performed, i.e., the at least partial oxidation of NO to $NO_2$.

In reactor 4, the flue gases travel from the bottom to the top over a further mixing path 5 which is configured as an exchange body, e.g., a Sulzer package type Mellapak 250 Y - PP or 316 L. The gases leave the reactor through a conduit 6. They are opposed by an aqueous $HNO_3$ solution as the washing liquid in a step-internal circuit flowing through mixer/package 5. This $HNO_3$ solution has a concentration of about 15% $HNO_3$. The $HNO_3$ solution is conveyed by a pump 7 from a vessel 8 through a distributor 9 and mixer 5 into the bottom chamber 10 of reactor 4. In chamber 10 into which the flue gases are also introduced, the down-flowing acid creates a free surface of $HNO_3$ solution from which, in correspondence with the temperature, a certain quantity of $HNO_3$ already changes to the gas phase together with the $H_2O$ vapor to react with the NO of the flue gases. However, the actual substance exchange, $HNO_3$ and $H_2O$ evaporation occurs when the flue gases enter into package 5. Excess $HNO_3$ solution can be extracted from chamber 10 through a conduit 11 while $HNO_3$ of a higher concentration from the second stage is fed in through a conduit 12 equipped with a pump 13, as $HNO_3$ is continuously consumed during the oxidation in the first stage.

Due to the provision of vessel 8 which is flooded during operation—and also due to vessels 20, 24 and 29 in the remaining washing liquid circuits—the quantity of liquid in the individual circuits can be kept small since the diameters of the vessels are small compared to those of the associated reactors 4, 16 and 33. Thus the period of dwell of the washing liquids in the circuits becomes relatively short; this is of advantage insofar as it permits the losses of $H_2O_2$, which is not stable and decomposes, to be kept low.

It is further possible to add $H_2O_2$ in the form of a 60% aqueous solution to the washing liquid circulating in the first stage, to wash out part of the described $NO_2$ according to the above listed Equation (2) already in this stage. The addition of $H_2O_2$ into the washing circuit of the first stage additionally causes residual contaminants such as, for example, $SO_2$ or HCl, to be bound into the washing liquid of the first stage.

The various "control" influences in the first stage will be described below in connection with further such influences in subsequent stages.

Conduit 6 connects the head chamber of reactor 4 with the bottom chamber 15 of reactor 16 of the second stage which serves as the actual washing stage for washing out the $NO_2$ according to Equation (2).

Reactor 16 is divided into two partial stages 17 and 18 in which $HNO_3$ solutions of different concentrations circulate as washing liquids. In the lower stage 17, a pump 19 pumps an approximately 20% to 40% $HNO_3$ solution from vessel 20 through distributor 21 and mixer/exchanger 22 into cavity 15 and back into vessel 20. With the aid of a pump 23, $H_2O_2$ solution is added to the washing liquid of the lower stage 17 in the form already mentioned. Moreover, from vessel 24 of the upper partial stage 18, $HNO_3$ solution of a lower concentration of about 7% is fed into the circuit of the lower partial stage 17.

In structure, upper partial stage 18 is identical with lower partial stage 17. It differs only in that the washing liquid conducted through it by means of a pump 27, a distributor 25 and a mixer/package 26 has a lower concentration than in the lower partial stage 17. $HNO_3$ is replenished into the upper partial stage 18 by means of a pump 28 from a vessel 29 of the third stage into vessel 24 of upper partial stage 18. $H_2O_2$ is added in measured quantities to upper partial stage 18 by means of a pump 30.

The "washed" flue gases penetrated by $HNO_3$ vapor leave partial stage 18 through a conduit 31 in order to be fed into the bottom chamber 32 of a reactor 33 of the third stage.

The division into the two partial stages has the purpose of keeping the $HNO_3$ concentration in the washing liquid of the last partial stage as low as possible; temperature and concentration of this washing liquid determine the $HNO_3$ vapor pressure and thus the quantity which is carried along through conduit 31 with the washed flue gases. In order to prevent the washing out of the $HNO_3$ vapor in the third stage from being too much of a stress, the $HNO_3$ concentration in the last partial stage 18 of the second stage is regulated in such a way that it will not exceed a maximum limit value.

It is of course also possible to divide the second stage into more than two partial stages 17 and 18.

In reactor 33 which includes a distributor 34 and a mixer 35 and corresponds in its structure to reactors 4 and 16, the $HNO_3$ vapor is removed from the purified gases by adsorption and condensation. In order to realize a sufficient degree of condensation to produce the required purity of the pure gases, a cooler 37 is provided in the washing liquid circuit of the third stage which includes a pump 36 and a vessel 29 in addition to a distributor 34 and a mixer 35. The coolant flow of this cooler can be varied with the aid of a variable choke member 38.

The $HNO_3$ concentration in the washing liquid of the third stage is very low, for example 0.5 to 1%.

As from the first stage, decontamination conduits 11 for excess $HNO_3$ solution branch off from the bottom chambers 15 and 32 of the second and third stages, with the excess acids from the first and third stages being fed into a preceding part of the system or a section of the flue gas purification process, while the relatively highly concentrated $HNO_3$ solution from the second stage can be utilized as a valuable product, for example for the production of fertilizer.

A blower 39 in a pure gas conduit 40 at the head of reactor 33 conducts the pure gas out of the system.

Three control assemblies 41, 42 and 43 are provided to control the system of FIG. 1. Device 41 which is, for example, a process computer, receives, as its basic value for the entire control, the quantity of $NO_x$ contaminants entering the system with the flue gases. To determine this quantity of contaminants, a combined measuring device 44 measures the stream of flue gas as a quantity per unit time and its $NO_x$ concentration which, as already mentioned, is present practically completely as NO; the concentration measurement is made according to a known method, for example, by utilizing chemiluminescence effects.

Additionally, computer 41 receives the actual value of a temperature difference measurement 47 between the flue gas temperatures measured at measuring locations 45 and 46 downstream and upstream of heat exchanger 2. From these two measured values—the temperature difference and the quantity of contaminants—computer 41 calculates the required quantity of $HNO_3$ vapor for oxidation and simultaneously, under consideration of the $H_2O$ evaporation also taking place when the temperature is raised, the required amount of heat. This is expressed as a desired value for the temperature difference at measuring locations 45 and 46. A controllable choke member 49 in feed conduit 48 for a heating medium, e.g., vapor, for heat exchanger 2 is influenced on the basis of the comparison of the desired value with the actual value.

$HNO_3$ consumed in the first stage must be continuously replaced through conduit 12; thus, computer 41 receives as a further input signal the measured values from a concentration measuring device 50 with which the $HNO_3$ concentration in the washing circuit of the second stage is determined. The computer uses the measured values from devices 44 and 50 as its basis and calculates therefrom the quantity of $HNO_3$ solution to be fed into the first stage from the second stage in order to maintain the necessary $HNO_3$ concentration in the first stage. The result of this calculation is utilized to regulate the rpm of the dosaging pump 13.

Computer 41 calculates in advance the quantities of $H_2O_2$ to be added in partial stages 17 and 18 on the basis of the determined $NO_x$ concentration in the incoming flue gases and employs these values for controlling the likewise rpm controlled pumps 23 and 30. Moreover, these two pumps are designed and matched with one another in such a way that the ratio of the $H_2O_2$ quantities conveyed by them always remains constant, independently of the total $H_2O_2$ quantity determined on the basis of the $NO_x$ concentrations.

The quantity of weakly concentrated $HNO_3$ solution fed from the third stage into the upper partial stage 18 of the second stage is varied by pump 28 whose rpm is controlled by a control device 42. Input values for device 42 are the values measured by concentration measuring device 50, i.e., the $HNO_3$ concentrations of the washing liquid of lower partial stage 17.

A further process computer 43 at the end of the system monitors and controls the $HNO_3$ vapor concentration in the pure gas leaving the system. Computer 43 receives as its input values the $HNO_3$ concentrations in the pure gas measured by a measuring device 51 and the temperature difference of the gases at the inlet and outlet of the third stage. This temperature difference is formed in a temperature measuring device 52 which receives the gas temperatures determined at locations 53 and 54.

From these input values, computer 43 determines the cooling power required in the third stage and controls this stage by varying the coolant stream through cooler 37 with the aid of the controllable choke member 38. The higher the required $HNO_3$ "purity" of the flue gases, the greater must be the generated cooling power.

Figure 2:
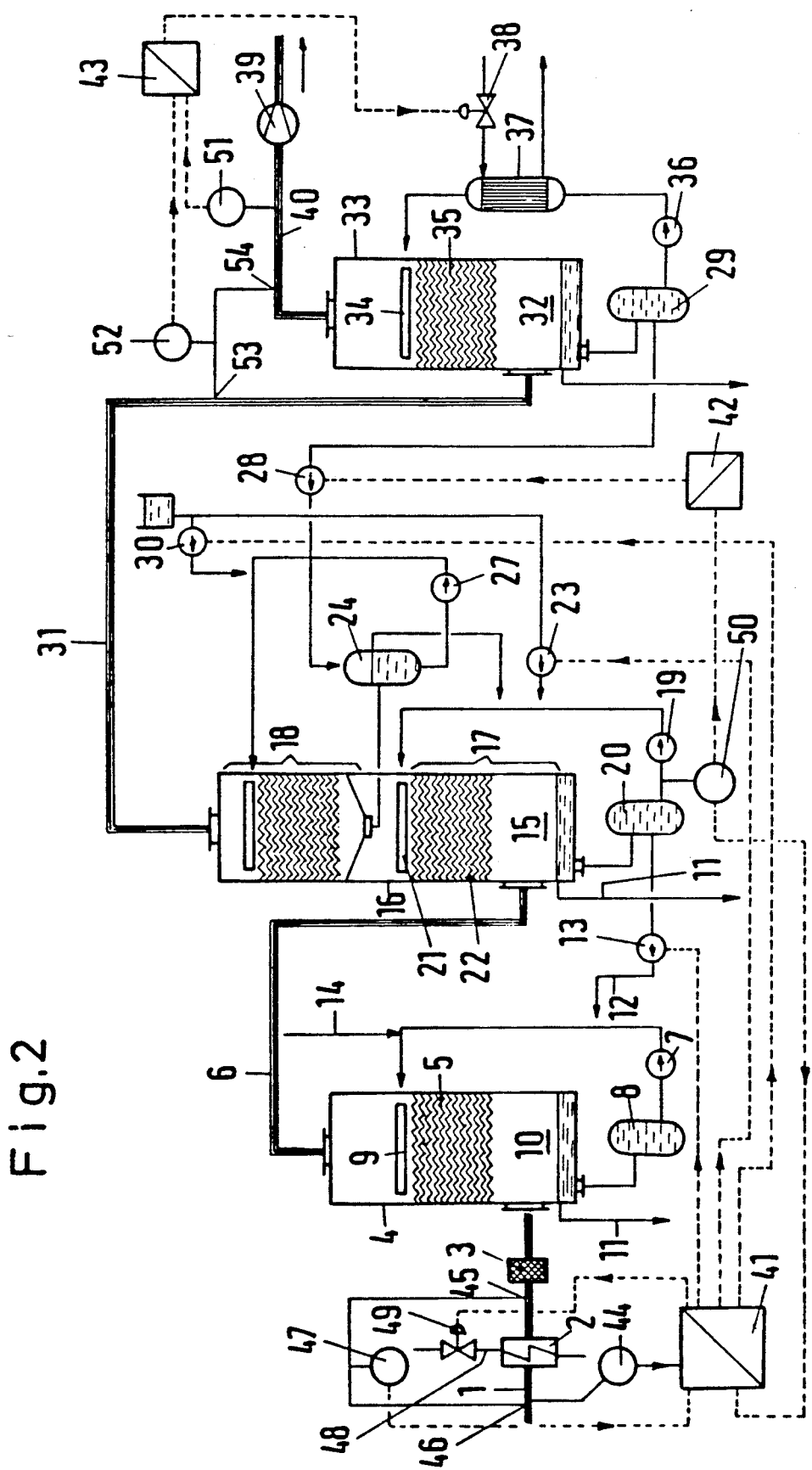
Figure 3:
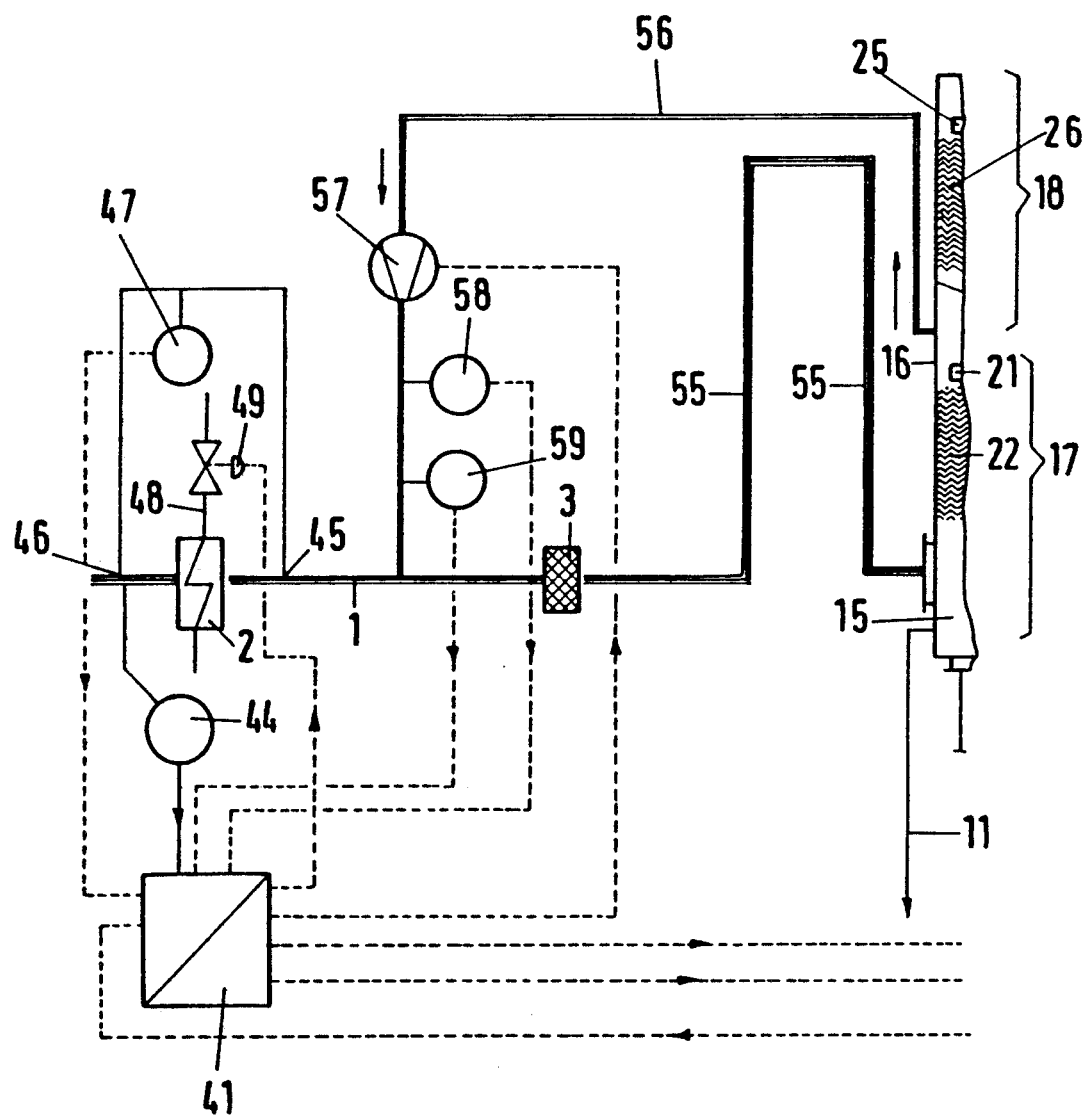
FIG. 3 depicts a modified first stage.

In the variation according to FIG. 3 of the system according to FIG. 2, reactor 4 of the first stage has been replaced by a simple direct contact path 55 for the flue gases. This direct contact path extends the flow path for the flue gases to permit the gas phase oxidation according to Equation (1) to occur before the flue gases enter into the second stage. This simplification is permissible because the vaporous $HNO_3$ required for the reactions is fed directly as vapor into the flue gases entering the system. This vapor is removed from the second stage at the end of first partial stage 17 and is conducted through a conduit 56 including a blower 57 into the feeder conduit 1 for the flue gases, with the flue gases which have been partially treated by the time they reach the end of the first partial path 17 serving as transporting means for the $HNO_3$ vapor.

To determine the quantity of $HNO_3$ vapor to be conveyed by blower 57, computer 41, in this case, receives, in addition to the values measured by device 44, concentration values for the $HNO_3$ concentration in conduit 56 measured in a device 58 and measured values for the quantity stream in this conduit 56 as measured at 59. The output signal of computer 41 for $HNO_3$ vapor quantity regulation controls the rpm of the drive motor (not shown) for blower 57.

The example shown below shows, in the form of a table, the removal of nitrogen from the flue gases in a trash incineration system as a concrete example for the efficiency of the novel process.

EXAMPLE

| | |
|---|---|
| incineration of trash, approx. | 9 tons trash/h |
| quantity of flue gases (raw gas) | 55,000 Nm3/h |
| state after wet washing: | |
| temperature | 60° C. |
| $SO_2$ content | 30 mg/Nm3 |
| HCl content | 5 mg/Nm3 |
| dust content | 10 mg/Nm3 |
| $NO_x$ content (in the form of $NO_2$) | 550 mg/Nm3 |
| pure gas after $NO_x$ wash | 55,000 Nm3/h |
| temperature | 57° C. |
| $NO_2$ content | 70 mg/Nm3 |
| First Stage (oxidation stage) - desorption | |
| heat supplied for heating | 100,000 kcal/h |
| heating of flue gas, about | 6° C.* |
| $HNO_3$ liquid circulation | 15% |
| liquid added ($HNO_3$ - 20%) | 108 kg/h |
| decontamination $HNO_3$-15% with $H_2SO_4$-10% | 20 kg/h |
| *Instead of supplying heat indirectly in apparatus 2, it is possible to admix hot air: | |
| quantity | 3,400 Nm3/h |
| temperature | 160° C. |
| Second stage (two-stage washing stage) - absorption | |
| lower partial stage | |
| $HNO_3$ concentration | 20% |
| quantity of $HNO_3$ produced | 150 kg/h |
| $H_2O_2$ requirement (basis 100%) | 21.15 kg/h |
| upper partial stage | |
| $HNO_3$ concentration | 7% |
| $H_2O_2$ requirement (100%) | 8.1 kg/h |
| liquid fed in (0.3% $HNO_3$) | 135 kg/h |
| total quantity of $H_2O_2$ (100%) | 29.25 kg/h |
| decontamination $HNO_3$-20% - useful substance | 150 kg/h |

-continued

Third stage (condensation washing) - adsorption

| | |
|---|---|
| $H_2O$ condensation | |
| temperature of pure gas | 57° C. |
| $HNO_3$ percentage | 0.3% |
| decontamination $HNO_3$-0.3% | 715 kg/h |
| Decontamination | |
| from oxidation (first stage) | 20 kg/h** |
| $HNO_3$-20% from washing stage (second stage) as useful subst. | 150 kg/h*** |

**decanting
***useful substance

| | |
|---|---|
| from condensation washing (third stage) | 715 kg/h**** |

20 kg and 715 kg decanted material enter into the preceding, already existing washing stages; the $H_2O$ here serves as the washing liquid and the $HNO_3$ as the oxidation agent for the $SO_2$.
****decanting

I claim:

1. In a process for the removal of nitrogen oxides ($NO_x$) from pretreated flue gases having a nitrogen oxide ($NO_x$) content which is low by means of a multi-stage washing process employing a nitric acid ($HNO_3$) solution to which is added hydrogen peroxide ($H_2O_2$), the process including a first stage in which the pretreated flue gases are received and contacted with nitric acid ($HNO_3$) vapor to at least partially oxidize nitrogen monoxide (NO) present in the pretreated flue gases to nitrogen dioxide ($NO_2$) and result in a first stage flue gas, and a second stage in which the first stage flue gas is received and washed with an aqueous nitric acid ($HNO_3$) solution to which is added $H_2O_2$ to remove nitrogen dioxide ($NO_2$) and any remaining nitrogen monoxide (NO) from the first stage flue gas and result in a second stage flue gas, wherein the pretreated flue gases have been treated to free flue gases of contaminants including at least one of sulfur dioxide ($SO_2$), hydrogen chloride (HCl) and hydrogen fluoride (HF), which contaminants are at least one of $H_2O_2$-decomposing and corrosive, and wherein the pretreated flue gases have been treated to free the flue gases of solid particles, the improvement comprising:

supplying to the first stage heat sufficient to prevent water ($H_2O$) condensation from the first stage flue gas;

increasing the concentration of diluted nitric acid ($HNO_3$) generated in the second stage, when the nitrogen oxide ($NO_x$) content of the flue gas is above a defined level, by, prior to the second stage, first concentrating the nitric acid in an absorption process and second drawings off the nitric acid which has been concentrated; and providing a third stage in which the second stage flue gas is received and washed with a diluted, aqueous nitric acid ($HNO_3$) solution to remove any remaining nitric acid ($HNO_3$) vapor from the second stage flue gas.

2. The process according to claim 1, wherein the first stage is a washing stage.

3. The process according to claim 1, wherein a partial stream of the acid generated in the second stage is conducted into the first stage and is evaporated by the addition of heat.

4. The process according to claim 2, wherein a partial stream of the acid generated in the second stage is conducted into the first stage and is evaporated by the addition of heat.

5. The process according to claim 1, wherein $HNO_3$ in vapor form is fed in directly upstream of or into the first stage.

6. The process according to claim 5, wherein $HNO_3$ vapor enriched flue gases from the second stage are returned into or upstream of the first stage.

7. The process according to claim 1, wherein a quantity of heat required to make at least partially available the necessary quantity of $HNO_3$ vapor is fed to the $HNO_3$ solution circulating in the first stage as washing liquid.

8. The process according to claim 1, wherein the quantity of $HNO_3$ vapor in the first stage is set in dependence on the NO and $NO_x$ concentration in the flue gases to be purified.

9. The process according to claim 8, wherein the quantity of $HNO_3$ vapor in the first stage is set so that in this stage an $NO/NO_2$ mixture is produced at a ratio of 1:1.

10. The process according to claim 5, wherein the first stage is constructed as a simple direct contact path.

11. The process according to claim 6, wherein the first stage is constructed as a simple direct contact path.

12. The process according to claim 1, wherein $H_2O_2$ is added to the washing liquid in the first stage.

13. The process according to claim 1, wherein $H_2O_2$ is fed into the aqueous nitric acid ($HNO_3$) solution of the second stage at the inlet of at least one of the first or second stage in a quantity which varies according to the $NO_x$ concentration in the flue gases; and wherein the aqueous nitric acid ($HNO_3$) solution of the second stage has an $HNO_3$ concentration which is regulated by one of addition of washing liquid from the third stage or addition of fresh water and in a quantity which varies according to the $NO_x$ concentration and the quantity of $H_2O_2$.

14. The process according to claim 1, wherein the nitrogen oxide is washed out in the second stage in at least two partial stages.

15. The process according to claim 14, wherein measured quantities of $H_2O_2$ are added to the washing liquid of each of the at least two partial stages, with the added quantities of $H_2O_2$ being divided in such a manner that, in the last partial stage, an upper limit for the $HNO_3$ concentration is not exceeded in the washing liquid.

16. The process according to claim 1, wherein the washing liquid of the third stage is cooled in a cooler.

17. The process according to claim 16, wherein the cooling power in the third stage is regulated in dependence on the maximum permissible concentration of $HNO_3$ in the purified flue gas.

18. The process according to claim 1, wherein the excess $HNO_3$ is fed as washing liquid to a flue gas purification process situated upstream of the present process.

19. The process according to claim 18, wherein contaminant laden decanting from the first stage and the excess of diluted $HNO_3$ from the third stage are introduced into a quench of a wash connected upstream and the $HNO_3$ from the second stage is extracted from the system as a useful substance.

* * * * *